Jan. 13, 1959   C. W. SMITS   2,868,904
SWITCH OPERATING MEANS
Filed Aug. 7, 1957   3 Sheets-Sheet 1
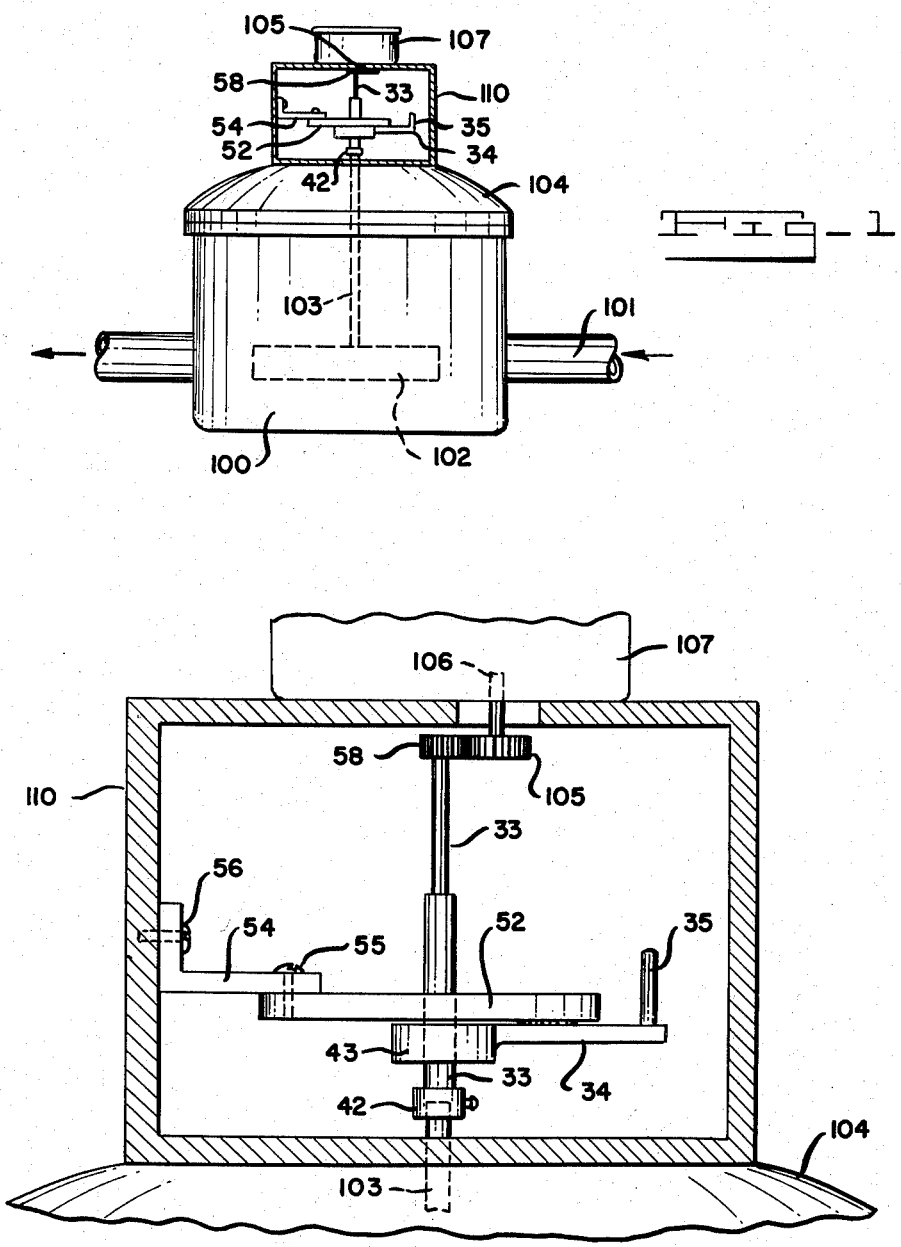
INVENTOR.
CLARENCE W. SMITS
BY Cullen & Cantor
ATTORNEYS Jan. 13, 1959  C. W. SMITS  2,868,904
SWITCH OPERATING MEANS
Filed Aug. 7, 1957  3 Sheets-Sheet 2
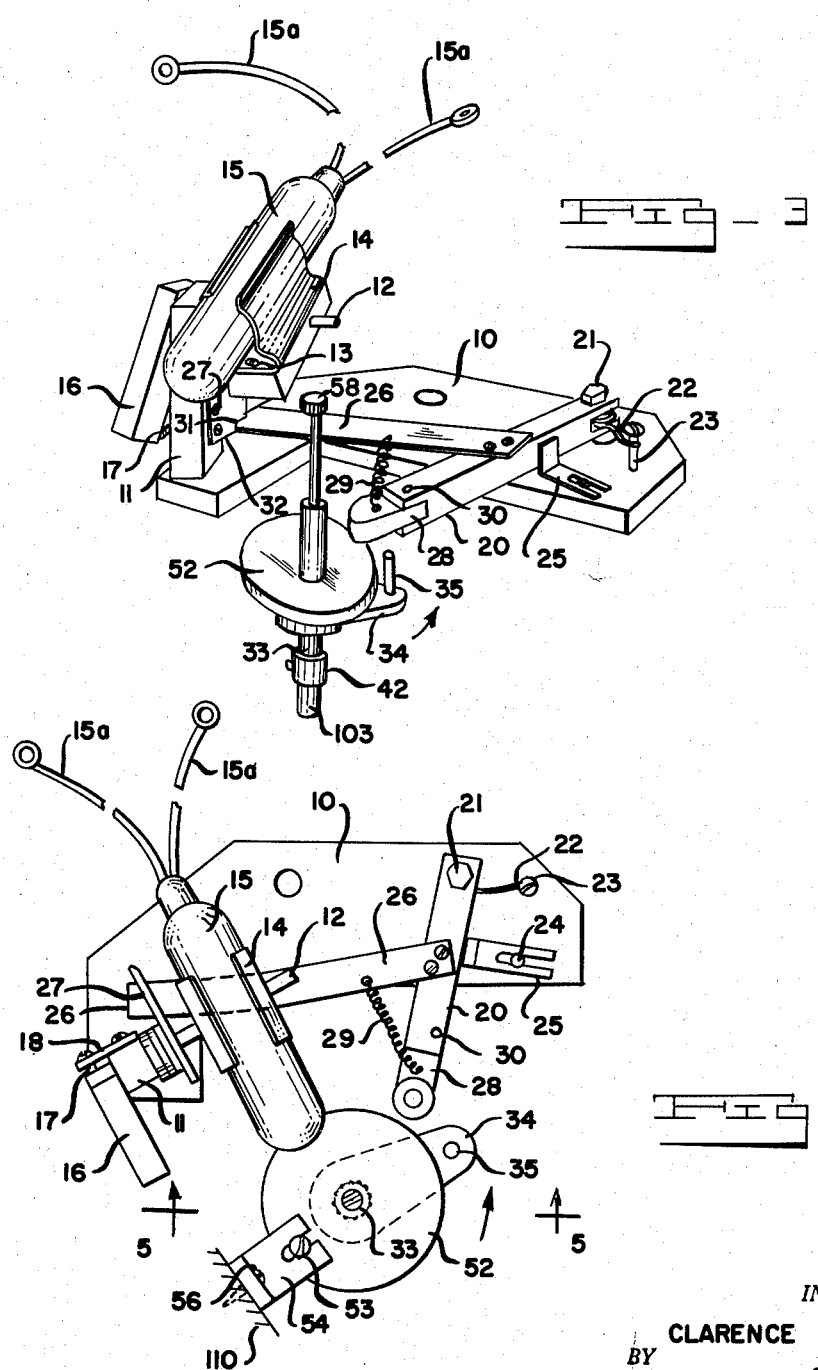
INVENTOR.
CLARENCE W. SMITS
BY
Cullen & Cantor
ATTORNEYS

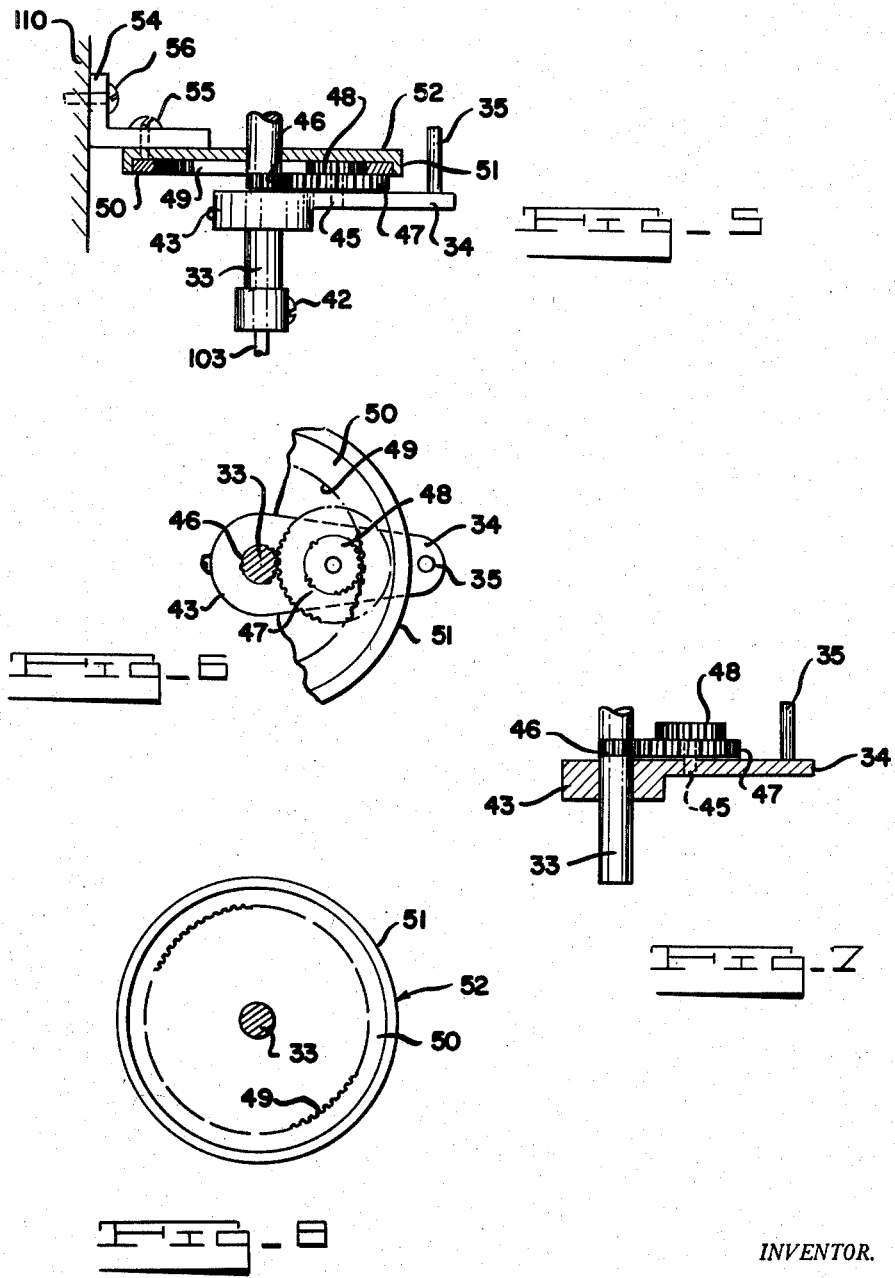

United States Patent Office 2,868,904
Patented Jan. 13, 1959

2,868,904

SWITCH OPERATING MEANS

Clarence W. Smits, St. Clair Shores, Mich., assignor to Dihydrol Company, Detroit, Mich.

Application August 7, 1957, Serial No. 676,789

1 Claim. (Cl. 200—32)

This application relates to means for rocking a mercury tube switch and particularly to means to rock the switch where the circuit is to be closed for very short and widely spaced time intervals.

This application discloses an improvement over the switch shown in the patent to Wade and Denny, 2,251,385 of August 5, 1941. The improvement resides particularly in including in the operating means for the switch a speed reduction gearing whereby the intervals between switch closings are increased a very considerable extent in response to movements of the prime mover namely, a water meter, which drives a rotating member of the operating means and thus actuates the switch in predetermined intervals in response to movements of the water meter.

Objects of the invention will become apparent to those skilled in the art upon reading the following description of one embodiment of the invention illustrated in the accompanying drawings.

In these drawings:

Fig. 1 shows a water meter and the switch hereof in conjunction therewith;

Fig. 2 is an enlarged view of parts of Fig. 1;

Fig. 3 is a perspective view of the switch, per se;

Fig. 4 is a top plan view of Fig. 3;

Fig. 5 is a section view as if on line 5—5 of Fig. 4;

Fig. 6 is an illustrative view of the gearing alone;

Fig. 7 is a section view of the gearing alone; and

Fig. 8 is a bottom plan view of a disc part of the mechanism.

The drawings and particularly Figs. 1 and 2, show part of a water treating system wherein a proportional flow of water treating fluid is pumped into a waterline. The pump is actuated by a circuit controlled by a switch and the switch is moved for opening and closing the pump circuit in response to movement of the water meter which in turn responds to flow of water in the line. A register connected to the meter records water flow. Thus, as water flows in the waterline being treated, the water meter shaft is rotated in response to water flow and such rotation of the meter shaft causes opening and closing of the switch repeatedly for opening and closing the pump circuit and thus pumping treating fluid proportionately into the water being treated.

Apparatus for this purpose includes a water meter, a register, and a switch casing interposed between the meter and the meter register, with the switch casing containing the switch and also the operating means for connecting the meter and register for rocking a switch part for opening and closing the circuit, with such operating means being connected to the meter and register shaft so that as the meter shaft rotates, the register records and also the switch part is rocked for opening and closing the pump circuit.

The subject matter of the present application relates particularly to a means for connecting the meter and register and for rocking the switch part, with such means being interposed between a water meter shaft and a register shaft so that the means responds to rotation of the meter shaft and drives the register shaft at the same speed as the meter shaft, and also rocks the switch part in a manner that is desired and is provided by the switch means of this application.

Hence, referring to the drawings, it will be seen that these show a water meter 100 connected in a waterline 101 and having a rotating impeller 102 mounted on a shaft 103 which projects through a hole in the upper part 104 of the meter. Normally, the shaft 103 has a gear thereon which coacts with a gear 105 of a register shaft 106 of a register 107 which normally is disposed directly on the top of the meter so that the meter shaft and the register shaft gear are interconnected through the meter gear, not shown here, whereby the register shaft 106 will rotate with and at the same speed as the meter shaft 103, all as dictated by the flow of water in the line 101.

In the construction hereof, a switch casing 110 is interposed between the top of the meter and the bottom of the register casing 107, and contains a switch, which will hereafter be described, having a part to be rocked for opening and closing the pump circuit, with the operation being effected by a means for operatively connecting the water meter shaft and the register gear 105, such means thus serving not only to connect the register to the meter for register operation, but also serving to rock the switch part contained within the casing 110.

In order to understand better the construction and operation of such means for rocking the switch part, we proceed to a description of the switch.

The switch

The switch comprises a plate 10 mounting an upright post 11 carrying a transverse rock shaft 12 to which is adjustably fixed, by a screw 13, a mercury tube switch holder comprising a spring clip 14, retaining in place a mercury tube switch 15 connected in the circuit to be controlled through suitable connecting conductors 15a.

Also fixed to the rock shaft 12 on the opposite side of the post 11 is a biasing counterweight 16 normally dropping its lower end against the end of an adjusting screw 17 carried by a bracket 18 extending from the post 11 near its base. The weight 16 is adjustably positioned on the shaft 12 and there secured by means of a set screw not shown.

Weight 16 rocks the switch 15 to the OFF position, and the final rest position of the switch 15 in OFF position is determined by the adjustment of the screw 17 acting on the weight 16.

Also mounted on base 10 and spaced laterally from post 11 is a rocker arm 20 secured by a pivot screw 21 and biased by a torsion spring 22 whose other end is fixed to a mounting screw 23. Spring 22 biases rocker arm 20 in the counterclockwise direction (Fig. 4), towards stop 25 fixed by screw 24. This rocker arm 20 is moved by means later to be described in opposition to spring 22, to a position where it can then be moved in a closing stroke by spring 22 for closing the switch.

Fixed to rocker arm 20 is a leaf spring part 26 whose end extends under the lower stepped edge of a rocker 27 fixed to the rock shaft 12 on the side of the post 11 opposite the weight 16.

Rocker arm 20 carries a hinged extension 28 that is normally maintained in an extended position by a tension spring 29 connecting the spring part 26 and the extension arm 28 and the latter is secured to the arm 20 by the pivot pin 30. The inner end of the extension arm 28 is brought into abutment with the arm 20 by the spring 29 to limit backward travel of the extension arm 28 towards the spring part 26 but permitting reverse travel, that is of the extension arm 28 away from the spring part 26.

Rocker 27 has a stepped under edge up against which the spring part 26 yieldingly bears. Such edge has a shoulder 31 and a part 32.

To set up the travel of the spring part 26 to shift rocker 27 and in turn the switch 15, any suitable drive means may be employed to push the extension arm 28 to the left, Fig. 4, to carry the spring part 26 clockwise, Fig. 4. In the present form, this driving means comprises a shaft 33 on the upper end of which is journalled an arm 34 that carries an upright pin 35 located at the proper radial distance from the shaft 33 to be in the path of the outer end of the arm 28 so that upon counterclockwise travel of the arm 34 (Fig. 4), the pin 35 will strike arm 28—20 to rock it counterclockwise (Fig. 4) and consequently push the spring part 26 back behind shoulder 31 of the rocker 27, it previously having been under edge part 32 of rocker 27.

When pin 35 passes by arm 28—20, it releases arm 28—20 whereupon spring 22 rocks arm 28—20 counterclockwise so that spring part 26 engages shoulder 31 and rocks rocker 27 forwardly to close the switch, part 26 passing by shoulder 31 and coming to rest under part 32 of rocker 27 which was returned from ON to OFF by weight 16.

The hinging of the extension arm 28 to the arm 20 prevents damage to the various parts should the arm 34 and its pin 35 be moved in a counterclockwise direction in which event the extension arm 28 would be shifted without setting up any travel of the spring arm 26 or the arm 20 which is in abutment with the stop 25.

The structure above described will cause an operation of the switch 15 once each revolution of the arm 34, this operation consisting of a closure of the switch following a shifting of the spring part 26 rearwardly of the step 31 on the rocker 27 and the return of that spring part 26 to its normal position under part 32 of rocker 27, which causes the switch 15 to be rocked to its closed position and then dropped to its open position as the spring part 26 leaves its previous position. The shape of the under surface of the rocker 27 behind shoulder 31 is such that the part 26 is positively pushed downwardly for disengagement with the step 31 rather than relying upon a greater travel of the part 26 which would be required in the absence of this construction.

By reversely mounting the switch 15 the switch may be normally in the closed position and then actuated to an open position by the structure above described.

Operating means

For rotating the arm 34 there is provided a speed reduction means which will now be described.

Connected to the upper end of the spindle 103 of the water meter is shaft 33, the connection being established by a coupling and set screw 42. Journalled on the upper end of shaft 33 is a collar 43 terminating in the arm 34. On shaft 33 above collar 43 is a pinion 46 meshing with a larger gear 47 rotatably carried on arm 34 and forming part of a compound gear whose other gear is a small pinion 48 above gear 47. Pinion 48 meshes with the internal gear teeth 49 of a ring 50 secured to and within flange 51 of a disc 52. Disc 52 is fixed to and mounted on the casing 10 by a bracket 54 secured by bolt 55 to the disc 52 and by screw 56 to the casing 110. As compound gear 48—47 is rotated by pinion 46, it orbits on the circular track formed by gear teeth 49 of the disc 52, on an axis identical with the axis of shaft 33, and since compound gear 48—47 is fixed by a pin 45 to arm 34, gear 48—47 rotates such arm around the same axis,
shaft 33, so that pin 35 rocks the rocker arm 20—28 of the switch.

Shaft 33 journals freely in stationary disc 52 and projects through it and continues upwardly. Its upper end has a pinion 58 which meshes with register gear 105 for actuating the register which indicates the amount of water flowing past the meter impeller 102 and rotating the meter shaft 103 and rocking the switch here shown for actuating the pump whose circuit is controlled by the switch.

The gearing herein provided enables an extremely slow movement of the arm 34 and pin 35 in response to normal movement of the water meter spindle 103.

In the specific gearing illustrated the ratio is 1 to 16, that is to say one revolution of the arm 34 in response to 16 revolutions of the meter spindle 103, but of course this can be varied as desired.

Now having described the construction herein disclosed, reference should be had to the claims which follow.

I claim:

A combination of a water meter, register, and switch between them, such switch controlling a circuit for a pump for proportionately feeding water treatment fluid into the waterline passing by the meter, with such switch having circuit opening and closing mechanism including a mercury tube holder, a rock shaft on which the holder is mounted, a counter weight for biasing the holder to one end of the rocking limit thereof, a rocker attached to said shaft and having a lower stepped edge interrupted by a shoulder, a rocker arm, a rocker arm spring part carried by the rocker arm and yieldingly pressing up against said edge, and a spring for said rocker arm for biasing it in one direction, operating means for operatively connecting the shaft of the water meter to the shaft of the register above it and spaced from the meter by the switch casinng, and for operatively connecting the meter shaft to said mechanism whereby rotation of the meter shaft, operating through such means, will rotate the register shaft and also will rock the rocker arm of the mechanism within the switch casing which likewise contains such operating means, such operating means comprising a shaft, couplers on its lower and upper ends for operatively coupling the shaft of the means to the water meter shaft and to a gear on the lower end of the register shaft, an operating arm journalled on said shaft between the ends of such shaft and having at its outer end a pin thereon, such pin being adapted to engage the rocker arm and move it for opening and closing the pump circuit controlled by such switch, the operating means further including a pinion on such shaft above the arm of the means, a compound gear also above said arm and journalled on it to one side of said shaft and having a lower gear part meshing with said pinion and an upper gear part rotating with the lower gear part, the lower gear part being larger in diameter than the upper gear part, a large disc above said arm having a central hole in which said shaft freely rotates, and having at its outer edge a downwardly extending flange formed with an internal gear concentric with the shaft and pinion and meshing with the upper gear part of the compound gear, and means for mounting said disc stationary on the switch casing located between the meter and the register and which contains the switch.

References Cited in the file of this patent

UNITED STATES PATENTS

| 2,088,599 | Johnson | Aug. 3, 1937 |
| 2,251,385 | Wade et al. | Aug. 5, 1941 |
| 2,281,139 | Clark | Apr. 28, 1942 |